(12) United States Patent
Giroud et al.

(10) Patent No.: US 9,281,502 B2
(45) Date of Patent: Mar. 8, 2016

(54) ELECTROCHEMICAL ACCUMULATOR WITH PACKAGING COMPRISING AT LEAST ONE POLYARYLETHERKETONE (PAEK) SHEET, SHEET AND ASSOCIATED MANUFACTURING METHODS

(75) Inventors: Nelly Giroud, Grenoble (FR); Helene Rouault, Le Versoud (FR); Sebastien Solan, Seyssinet-Pariset (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 703 days.

(21) Appl. No.: 13/576,088

(22) PCT Filed: Jan. 31, 2011

(86) PCT No.: PCT/EP2011/051289
§ 371 (c)(1),
(2), (4) Date: Sep. 6, 2012

(87) PCT Pub. No.: WO2011/095448
PCT Pub. Date: Aug. 11, 2011

(65) Prior Publication Data
US 2012/0328931 A1 Dec. 27, 2012

(30) Foreign Application Priority Data
Feb. 2, 2010 (FR) .................................... 10 50726

(51) Int. Cl.
*H01M 2/08* (2006.01)
*B23P 11/02* (2006.01)
*H01M 2/02* (2006.01)
(Continued)

(52) U.S. Cl.
CPC ............ *H01M 2/0277* (2013.01); *H01M 2/021* (2013.01); *H01M 2/0215* (2013.01); *H01M 2/0262* (2013.01); *H01M 2/0275* (2013.01); *H01M 2/0257* (2013.01); *H01M 2/0287* (2013.01); *H01M 2/06* (2013.01); *Y10T 29/49865* (2015.01)

(58) Field of Classification Search
None
See application file for complete search history.

(56) References Cited

U.S. PATENT DOCUMENTS 6,461,757 B1 * 10/2002 Sasayama et al. .............. 429/59
6,632,538 B1   10/2003 Yamazaki et al.
(Continued)

FOREIGN PATENT DOCUMENTS

EP         1 939 957 B1    1/2012

OTHER PUBLICATIONS

International Search Report Issued Sep. 13, 2011 in PCT/EP2011/051289.
(Continued)

*Primary Examiner* — Ula C Ruddock
*Assistant Examiner* — Matthew Van Oudenaren
(74) *Attorney, Agent, or Firm* — Oblon, McClelland, Maier & Neustadt, L.L.P

(57) ABSTRACT

The invention concerns a new flexible or rigid packaging for an electrochemical accumulator (A).
It is made from at least one polyaryletherketone (PAEK) sheet, notably a polyetheretherketone (PEEK™) sheet.
According to a preferred embodiment, a polyaryletherketone (PAEK) sheet (6.1, 6.2, 6.3, 61) incorporates within it at least one metal stud (40, 50) constituting one of the poles of the accumulator. The main application sought is the packaging of lithium-ion accumulators.

6 Claims, 6 Drawing Sheets

Figure 1:
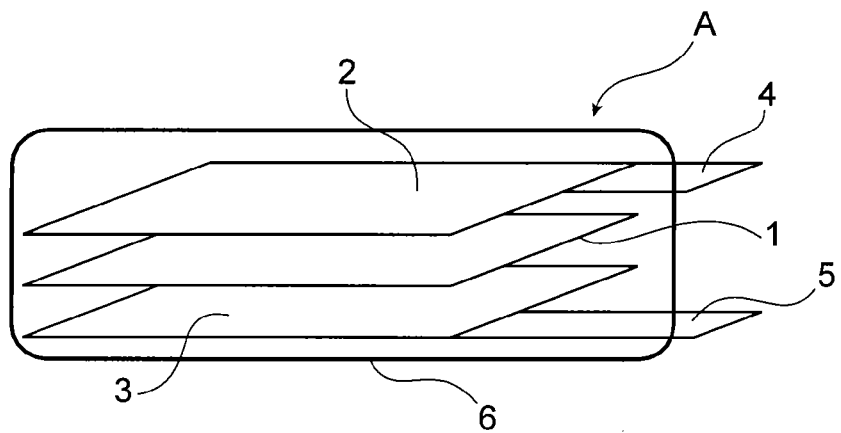

(51) Int. Cl.
  *H01M 4/75* (2006.01)
  *H01M 2/06* (2006.01)

(56) References Cited

U.S. PATENT DOCUMENTS

| | | | |
|---|---|---|---|
| 2004/0029001 A1 | 2/2004 | Yamazaki et al. | |
| 2006/0040177 A1* | 2/2006 | Onodera | H01G 9/08 429/174 |
| 2006/0093898 A1* | 5/2006 | Kwak | H01M 2/0202 429/94 |
| 2007/0248881 A1 | 10/2007 | Scott et al. | |
| 2008/0118831 A1 | 5/2008 | Jouanneau-Si-Larbi et al. | |
| 2008/0217078 A1* | 9/2008 | Kobayashi | H01M 2/024 180/65.1 |
| 2009/0155679 A1* | 6/2009 | Zhu | H01M 2/0207 429/151 |

OTHER PUBLICATIONS

French Preliminary Search Report Issued Sep. 7, 2010 in Patent Application No. 1050726 (with English translation of Categories of Cited Documents).

* cited by examiner

ELECTROCHEMICAL ACCUMULATOR WITH PACKAGING COMPRISING AT LEAST ONE POLYARYLETHERKETONE (PAEK) SHEET, SHEET AND ASSOCIATED MANUFACTURING METHODS

TECHNICAL FIELD

The invention concerns the manufacture of a packaging for electrochemical accumulators comprising at least one sheet made of polyaryletherketone (PAEK), and in particular made of PEEK™.

The main application sought by the invention is packaging for lithium accumulators.

The invention concerns in particular a sheet incorporating within it at least one metal stud, where the metal stud(s) constitute(s) the poles of the accumulator.

The invention also concerns methods of manufacture of such a sheet.

As explained below, depending on the configuration of the electrochemical accumulator the sought packaging can be flexible or rigid.

PRIOR ART

As represented schematically, a lithium-ion battery or accumulator or A habitually comprises an electrochemical cell including an electrolyte constituent 1 between a positive electrode or cathode 2 and a negative electrode or anode 3, a current collector 4 connected to cathode 2, a current collector 5 connected to anode 3 and, finally, packaging 6 designed to contain the electrochemical cell in sealed fashion whilst being traversed by a portion of current collectors 5, 6.

Electrolyte constituent 1 can be in solid, liquid or gel form. In the latter form the constituent can comprise a separator made of polymer or of microporous composite soaked with organic electrolyte(s) or electrolyte(s) of the ion liquid type which allow the lithium ion to move from cathode 2 to anode 3 when charging, and in the reverse direction when discharging, which generates the current. The electrolyte is generally a blend of organic solvents, for example carbonates to which a lithium salt, typically $LiPF_6$, is added.

The positive electrode or cathode 2 includes materials for inserting the lithium cation, which are generally composite, such as $LiFePO_4$, $LiCoO_2$, $LiNi_{0.33}Mn_{0.33}Co_{0.33}O_2$, etc.

The negative electrode or anode 3 very often includes graphite carbon, or is made of $Li_4Ti_5O_{12}$ (titanate material), or may also have a silicon base or a silicon-based composite base.

Current collector 4 connected to positive electrode 2 is generally made of aluminium.

Current collector 5 connected to negative electrode 3 is generally made of copper, nickel-plated copper or aluminium.

A lithium-ion battery or accumulator may of course comprise several electrochemical cells 1, 2, 3 stacked on top of one another.

Depending on the type of application sought, the aim is to manufacture either a fine and flexible lithium-ion accumulator, or a rigid accumulator: packaging 6 is then either flexible, or rigid and in some way constitutes a case.

Flexible packagings are currently manufactured from a multi-layered composite material typically including a stack of aluminium layers covered by a polymer. For the most part, the polymer covering the aluminium is chosen from among polyethylene (PE), propylene or polyamide (PA), or may be in the form of an adhesive layer including polyester-polyurethane. The company Showa Denko sells this type of composite material for use as packaging for batteries.

Figure 2:
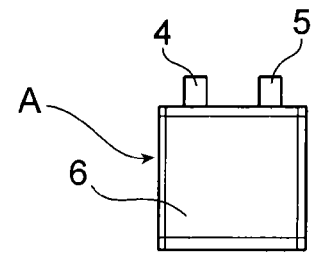

Reference may be made to FIG. 2, which illustrates this type of flexible packaging manufactured from a stack of aluminium layers supplied by the company Showa Denko with references N°. ADR-ON25/AL40/CPP40 or N° ADR-ON25/AL40/CPP80. It can be seen in this FIG. 2 that flexible packaging 6 is designed to contain the electrochemical cell(s) in sealed fashion whilst being traversed by a portion 40, 50 of two strips 4, 5 forming the poles, and which extend in the plane of the electrochemical cell(s).

The major disadvantage of these flexible packagings is the problem of long-term sealing. Indeed, the inventors have been able to demonstrate that after a substantial period, typically 6 months to 1 year, oxidisation could occur in the positive pole (positive current collector) of the battery. This oxidisation causes the flexible packaging to open, or in other words causes a loss of the sought seal and, consequently, leakages of the electrolyte. And these leakages can be dangerous since the chemical which then escapes from the packaging can contain hydrofluoric acid. When heated the escaped hydrofluoric acid may cause the battery to ignite.

Rigid packagings are, for their part, used for more constrictive applications, in which a long lifetime is sought where, for example, much higher pressures must be withstood, and where a more strict required degree of sealing is required, typically below $10^{-8}$ mbar.l/s, or in high-stress contexts such as the aeronautical or space fields.

For this reason a rigid packaging currently includes a metal case, typically made of stainless steel (stainless steel 316L or stainless steel 304), aluminium (Al 1050 or Al 5754) or titanium.

Two types of rigid case are currently manufactured.

Figure 3:
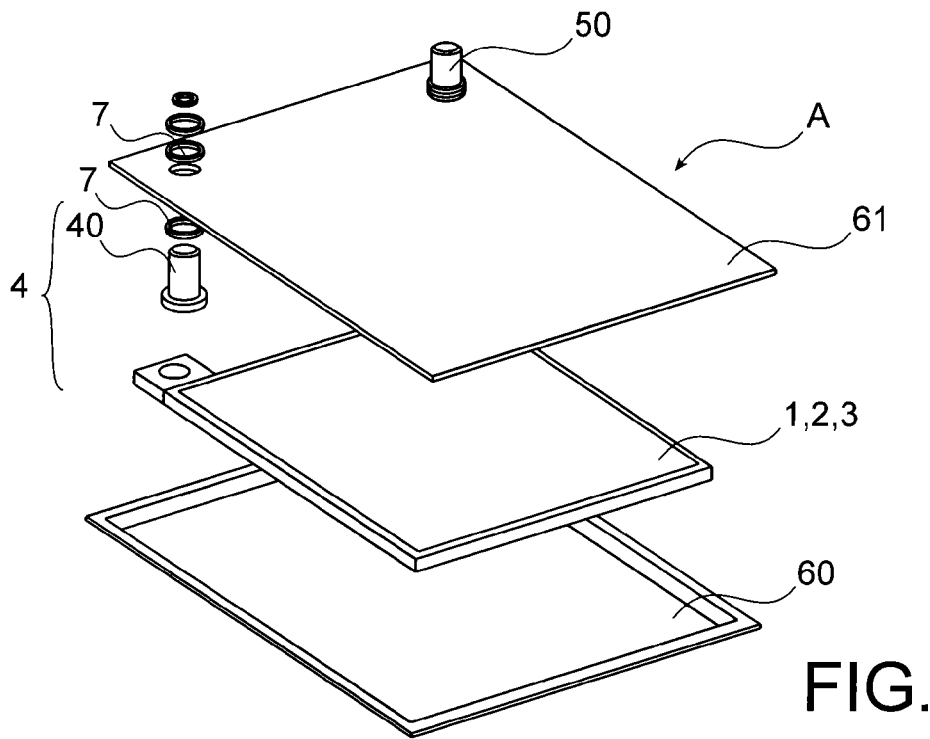
Figure 3A:
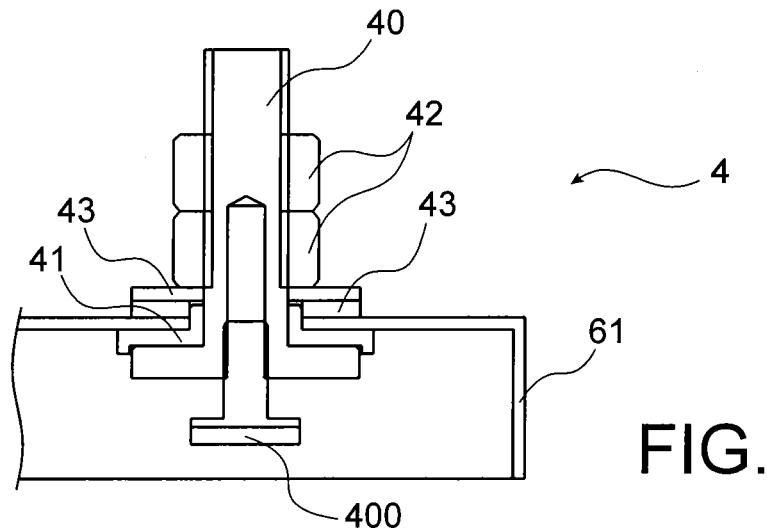

The first type is illustrated in the exploded perspective view in FIG. 3. The represented lithium-ion accumulator comprises a stack of electrochemical cells 1, 2, 3 which is housed between base 60 of case 6, which is a machined part, where cover 61 and base 60 of case 6 are welded to one another on their periphery by a laser. Current collectors 4, 5 comprise a portion 40, 50 protruding on the top of the case, as represented at the top right in FIG. 3. These protruding portions 40, 50 form the visible poles of the battery. An example of an assembly of such a current collector 4, with cover 61 of a case 6, is shown in FIG. 3A: collector 4 is typically made of stainless steel, and is inserted in a socket 41, and attached by screwing using two screws 42 of the M5 or M8 type. Two washers 43, typically made of PTFE or PEI, superimposed on one another, are inserted between cover 61 and nut 42. These washers 43, together with socket 41, provide the sealing and electrical insulation of the collector relative to case cover 41. In addition, a screw 400 of the M2 type screwed into portion 40 acts as a current connector. The assembly constituted in this manner is bulky because screw 40, with protruding portion 40, are of non-negligible height.

Figure 4:
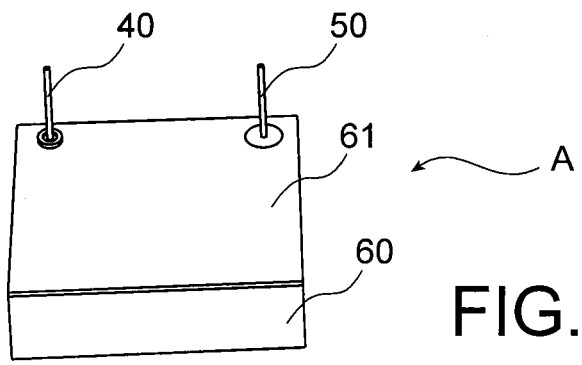

The second type is illustrated schematically as a perspective view in FIG. 4. In this case the rigid case is also manufactured with a machined base 60 and a cover 61, which are welded together on their periphery by a laser. Conversely, as represented in a schematic section view in FIG. 4A, current collectors 4, 5 in this case partly include metal wires 40, 50 or slugs. As can be seen in this FIG. 4A, such a slug 40 is welded by electrical welding or by ultrasound to portion 41 of corresponding current collector 4, which is itself connected to one of the electrodes of the stack of electrochemical cells. To provide the electrical insulation between metal cover 61 of the case and metal slug 40, a glass bead 8 encloses slug 40, constituting by this means what is commonly called a glassto-metal passage(TVM). In addition, to accomplish the sealing with cover 61 of the case, a collar 7 around glass bead 8, generally made of the same metal as that of the case, is welded to the latter. Certain configurations involve the use a single TVM, where the case constitutes the other pole of the accumulator.

Whatever their type, rigid cases 6, 60, 61 have non-negligible disadvantages which may be summarised as follows:
- bulkiness and/or complexity of production of the portion of the current collectors forming the poles of the accumulator,
- heating of the electrolyte,
- high weight,
- electromagnetic interference with nearby sensors and/or a nearby antenna, Indeed, screw-based connector technologies or glass-to-metal passages (TVM) used can protrude above the cover of the case by as much as 10 mm or even 15 mm.

Use of connector technology at the scale of accumulators can be difficult to implement.

TVM technology is an advanced technology, and a perfect degree of sealing must be guaranteed: moreover the applicant has developed TVMs of very high quality for high-potential lithium-ion accumulators, as disclosed in application EP 1939957 A1. In certain cases, for example when it is necessary to change the material of the case, all the elements comprising it (glass, slug, etc.) must be redesigned.

In addition, by definition, the metals constituting the cases often have high thermal conductivity, which is detrimental for the electrolyte, since it must not be heated, particularly not above 60° C. Also by definition, the high density of the metals constituting the cases can be prohibitive for certain applications, such as the space field, where every transported gram is important.

Furthermore, if the battery is only a component of a more complex system in which there are nearby sensors and a nearby antenna, for preventive reasons it is necessary to position the latter at a non-negligible distance from the metal case of the battery in order to prevent electromagnetic interference.

The aim of the invention is therefore to propose a new universal packaging solution for electrochemical accumulators, namely one which is able to resolve both the disadvantages of the flexible and rigid packagings of currently existing electrochemical accumulators.

The aim of the invention is therefore to propose both a solution for packaging electrochemical accumulators which is flexible, i.e. non-rigid, which has no long-term sealing problem, and also a solution for rigid packaging of electrochemical accumulators of lesser weight, which does not pose the risk of causing electromagnetic interference and of heating the electrolyte, and which avoids any complexity of production and/or bulkiness of the portion of the current collectors forming the poles.

DESCRIPTION OF THE INVENTION

To accomplish this, a first object of the invention is therefore an electrochemical accumulator comprising at least one electrochemical cell including at least one anode and one cathode either side of an electrolyte, two current collectors, each including a strip, one of which is connected to the anode, and the other of which to the cathode, and packaging designed to contain the electrochemical cell(s) in sealed fashion, whilst being traversed by a proportion of the strips forming the poles which extend in the plane of the electrochemical cell(s), characterised in that the packaging includes at least one polyaryletherketone (PAEK) sheet.

According to this embodiment of the invention, the packaging includes a single (PAEK) sheet folded into two portions which are attached to one another at their periphery.

Another object of the invention is an electrochemical accumulator comprising at least one electrochemical cell including at least one anode and one cathode either side of an electrolyte, two current collectors, each including a strip, one of which is connected to the anode, and the other of which to the cathode, and packaging designed to contain the electrochemical cell(s) in sealed fashion, whilst being traversed by a proportion of the strips forming the poles which extend in the plane of the electrochemical cell(s), characterised in that the packaging includes at least one polyaryletherketone (PAEK) sheet. According to this other embodiment, the packaging includes multiple polyaryletherketone (PAEK) sheets which are attached to one another at their periphery.

The sheet(s) of the packaging are preferably made of polyetheretherketone (PEEK™).

Another object of the invention is an electrochemical accumulator comprising at least one electrochemical cell including at least one anode and one cathode either side of an electrolyte, two current collectors, one of which is connected to the anode and the other of which to the cathode, and packaging designed to contain the electrochemical cell in sealed fashion, whilst being traversed by a proportion of the current collectors forming the poles, characterised in that the packaging comprises at least one polyaryletherketone (PAEK) sheet, incorporating within it at least one metal stud constituting one of the poles of the accumulator, where the said stud is welded to the portion of a current collector contained within the packaging.

According to a variant embodiment, the packaging includes a single polyaryletherketone (PAEK) sheet incorporating within it two metal studs constituting the two poles of the accumulator, where the said sheet is folded into two portions which are attached to one another at their periphery, and where each of the two studs is welded to the portion of a current collector contained within the packaging.

According to another variant embodiment, the packaging includes a single polyaryletherketone (PAEK) sheet incorporating within it two metal studs constituting the two poles of the accumulator and a polyaryletherketone (PAEK) sheet without metal studs, and attached at its periphery to the PAEK sheet, incorporating both metal studs, where each of the two studs is welded to the portion of a current collector contained within the packaging.

According to another variant embodiment, the packaging includes two polyaryletherketone (PAEK) sheets, each incorporating within it a metal stud constituting one of the poles of the accumulator, where each of the two studs is welded to the portion of a current collector contained within the packaging.

When the packaging includes two polyaryletherketone (PAEK) sheets, their unit thickness can advantageously be chosen such that they are rigid, where one of the sheets is machined to constitute a base of a case to contain the electrochemical cell, and where the other sheet incorporating the metal studs constitutes the cover of the case.

The sheet(s) of the packaging are preferably made of polyetheretherketone (PEEK™).

One of the metal studs may be made of aluminium welded to the internal part of the current collector, which is itself made of aluminium and connected to the cathode.

One of the metal studs may also be made of copper welded to the internal part of the current collector, which is itself made of copper and connected to the anode.

Both portions of a PAEK sheet folded in two, or both PAEK sheets, can be attached to one another by self-adhesion, bonding, ultrasound, laser or by heat sealing.

The accumulator described above advantageously constitutes a lithium-ion accumulator.

The invention also concerns a polyaryletherketone (PAEK) sheet incorporating within it at least one metal stud, and notably incorporating within it two metal studs.

The sheet is preferably made of polyetheretherketone (PEEK™).

The metal of the stud(s) may be chosen from among Al, Cu, CuNi, Ti, Pt, Ag, Au, stainless steel, or alloys including these metals.

As an alternative, the metal stud(s) protrude(s) by a height of at most equal to 1 mm, and typically equal to 250 μm, relative to at least one of the faces of the sheet.

The height of the metal stud(s) is/are preferably approximately equal to the thickness of the sheet.

The metal stud(s) may have a circular, parallelogram or square straight section.

The invention also concerns a method for manufacturing a polyaryletherketone (PAEK) sheet incorporating within it at least one metal stud, according to which the following steps are accomplished:
a/ forming of an opening within at least one polyaryletherketone (PAEK) sheet,
b/ freezing of a metal bar (9) to reduce its straight section to dimensions smaller than those of the opening,
c/ introduction of the frozen bar into the opening of the polyaryletherketone (PAEK) sheet,
d/ holding of the frozen bar in the opening of the sheet at ambient temperature until it is adjusted whilst tightening,
e/ cutting of the bar along its straight section, once it has expanded and adjusted whilst tightening in the opening of the sheet, to constitute the metal stud.

The sheet to be manufactured is preferably made of polyetheretherketone (PEEK™).

Step e/ may be accomplished using a wire.

Step a/ may be accomplished with a single sheet, which is sufficiently thick to be rigid.

The following actions are advantageously accomplished:
step c/ until a connection is made with a portion of a current collector positioned on the side of the rigid sheet opposite that into which the bar was introduced,
step d/, holding the connection of the bar with the current collector,
step e/ by cutting the bar only on the side of the sheet through which the bar is introduced, where the stud incorporated in the sheet is thus also permanently connected with the portion of the current collector.

Step a/ may be accomplished with a stack of sheets which are of sufficiently low unit thickness to be flexible, where a rigid divider is interposed between two flexible sheets.

Finally, the invention concerns a method for manufacturing a polyaryletherketone (PAEK) sheet incorporating within it at least one metal stud, according to which the following steps are accomplished:
a/ manufacture of a first piece of polyaryletherketone (PAEK) sheet,
b/ bonding of a second piece of polyaryletherketone (PAEK) sheet around the perimeter of a metal sheet,
c/ superimposition of the first piece of polyaryletherketone (PAEK) sheet on the metal sheet such that the two pieces of polyaryletherketone (PAEK) sheet overlap,
d/ attachment by ultrasonic bonding between the two overlapping pieces of polyaryletherketone (PAEK) sheet.

The sheet to be manufactured is preferably made of polyetheretherketone (PEEK™).

The inventors judiciously thought of using PAEK and more specifically PEEK™ as a packaging constituent of electrochemical accumulators, and more specifically lithium-ion accumulators.

The inventors are indeed familiar with this family of materials, and particularly PEEK™, and when listing their advantageous characteristics, as below, they believed that it/they would be perfectly suited to the manufacture of the packaging, whether flexible or rigid, of a lithium-ion accumulator.

The advantageous characteristics of the PAEK family may be defined as follows:
ability to withstand high temperatures: properties are maintained when it is exposed to a wide range of temperatures,
mechanical robustness and dimensional stability: excellent robustness, rigidity, long-term creep-resistance and fatigue-resistance,
resistance to wear and tear: high resistance to wear and tear, and to cutting, and low friction coefficient,
chemical resistance: resistant to a wide range of chemicals at high temperatures in hostile environments, and notably to the very corrosive products used in the aeronautical field (such as skydrol®),
resistance to hydrolysis: low absorption of moisture, resistant to dripping, to water and to brine, with low permeability,
electrical characteristics: natural flame retardant with electrical properties which are unchanged over a very wide range of frequencies and temperatures,
purity: inherent purity with low production of particles, and low degassing, which is advantageous for vacuum applications, or low-pressure applications,
recyclability.

In addition, compared to the rigid packaging materials of lithium-ion accumulators of the prior art, as described in the preamble, the inventors believed that the thermal conductivity and density intrinsic to PEEK™ will enable the respective problems of heating of the electrolyte and of weight to be resolved effectively.

The table below is a comparative summary of these magnitudes between the materials of the rigid cases of the prior art (stainless steel, aluminium, titanium) and PEEK™:

|  | Thermal conductivity $W \cdot m^{-1} \cdot K^{-1}$ | Density $(g \cdot cm^{-3})$ |
| --- | --- | --- |
| Stainless steel | 26 | 7.8 |
| Aluminium | 237 | 2.7 |
| Titanium | 21.9 | 4.5 |
| PEEK ™ | 0.25-0.92 | 1.2-1.4 |

This table illustrates the thermal and weight-related advantages of PEEK™ for constituting a rigid packaging of a lithium-ion accumulator.

This being so, when considering the very many varied fields of use of PEEK™ (aeronautics, motor vehicles, semiconductors, electronics, medical, food production, military), the inventors observed that this material has never been used as a constituent for packaging of parts.

To constitute a satisfactory flexible packaging, the inventors then thought that in order to obtain perfectly sealed packaging it was necessary to improve the self-adhesion between PEEK™ sheets instead of adding a specific layer of adhesive which would necessarily require a check to be made that it was compatible with PEEK™.

They then thought of subjecting this type of sheet to a plasma treatment, the effect of which is to modify the structure of the treated surfaces, where the grafting of chemical bonds encourages wettability and interfacial attraction, or the creation of new chemical bonds by division of molecular chains.

They were able to observe that such a plasma treatment produced perfectly appropriate bonding characteristics. A resistance of the bonding after plasma treatment was thus able to be assessed at approximately 5 MPa.

Self-adhesion having been achieved, an important unknown element remained, namely to know definitively whether PEEK™ sheets which had been made self-adhesive could maintain this adhesive characteristic when in contact with an electrolyte of an electrochemical cell. The inventors then made the following test. A self-adhesive PEEK sheet was placed in a liquid electrolyte including the following blend:

EC/PC/DMC (EC: ethylene carbonate, PC: propylene carbonate, DMC: dimethyl carbonate),
with an addition of 2% by mass of VC (VC: vinylene carbonate) in which a quantity of 1 mol·$L^{-1}$ of $LiPF_6$ is dissolved.

The direct contact between the PEEK™ sheet and the electrolyte was maintained for a period of fifteen days. In an unexpected manner, the self-adhesion of the PEEK™ sheet was completely maintained. In addition, prototypes of flexible packaging with PEEK™ sheets 12 μm thick, such as the one represented in FIG. 4, perfectly preserved their seal.

To constitute a rigid packaging, the inventors wondered how the choice of rigid PEEK™ sheets could resolve the problem of bulkiness and/or complexity of manufacture of the portion of current collectors forming the poles.

They then envisaged integrating metal studs constituting these poles within a PEEK™ sheet.

By means of both devised methods, respectively freezing of metal bars and insertion in a PEEK™ sheet, and bonding of pieces of sheet by ultrasonic bonding, they were able to produce perfect mechanical integration of copper and aluminium studs. The portion of the current collectors forming the poles was thus able to be manufactured without using TVMs, enabling a battery with a completely flat profile to be obtained, the entire surface of which can be re-used. Furthermore, rigid batteries of less than 1 mm thick can be manufactured, since TVM technology and screwed connector technology are avoided.

By this technique of integration by freezing of a metal bar with insertion in an opening of a PEEK™ sheet it is also conceivable to confine copper or aluminium in a very thin (<30 μm) PEEK™ sheet. The variant of the method described above, with a rigid divider positioned between two flexible sheets of very small unit thickness, thus enables, in an unexpected manner, flexible packaging for electrochemical accumulators to be designed with poles which do not protrude beyond the plane of the electrochemical cell(s). In other words, by manufacturing studs incorporated all the way through from top to bottom it is possible to reduce the length and width dimensions of an electrochemical accumulator packaged in a flexible packaging.

Another advantage relating to the use of rigid PEEK™ sheets as rigid packaging of electrochemical accumulators is that it is possible to reduce still further the bulkiness of complex systems powered by such accumulators. Thus, for example, it is possible to bond antennae or sensors directly to the rigid case without any risk of electromagnetic interference.

The family of polyaryletherketone (PAEK) polymers which is suitable for the invention comprises the following polymers:
PEK,
PEEK™,
PEKK,
PEEKK,
PEKEKK (polyetherketoneetherketoneketone).

BRIEF DESCRIPTION OF THE ILLUSTRATIONS

Figure 4A:
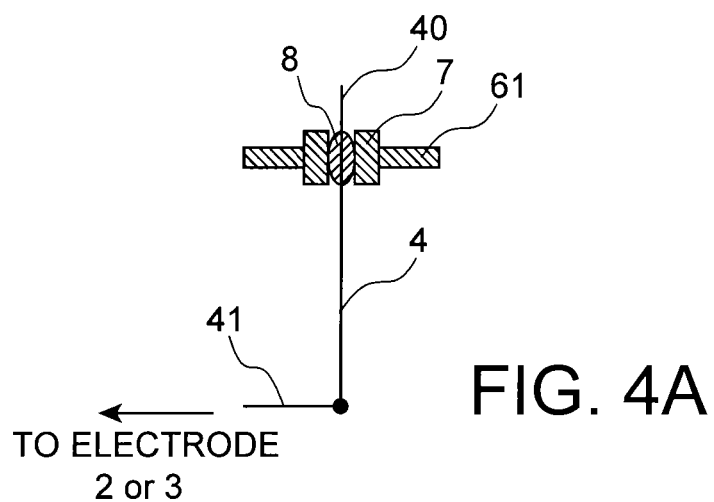
Figure 5:
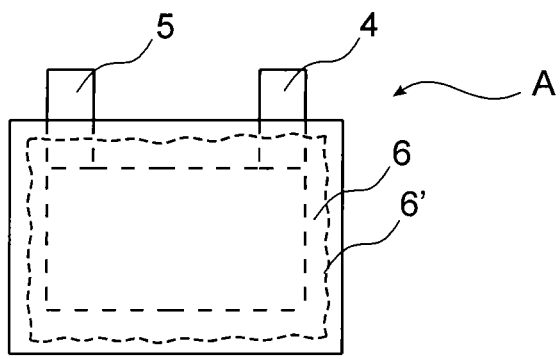
Figure 6:
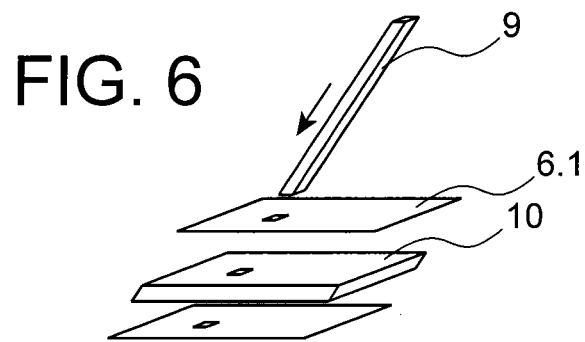
Figure 6A:
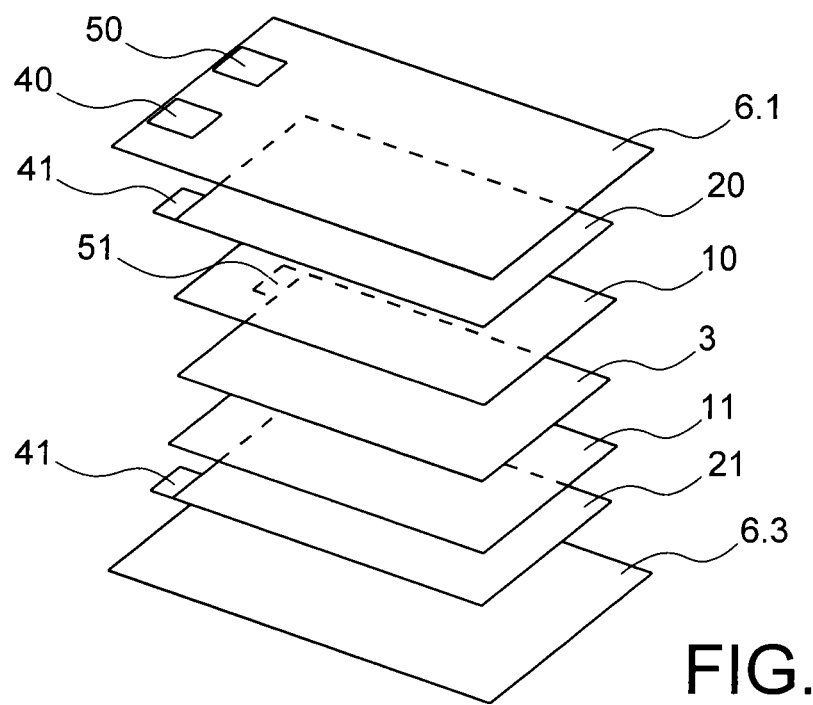
Figure 7:
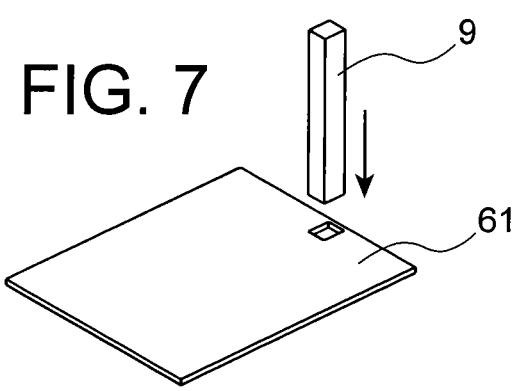
Figure 7A:
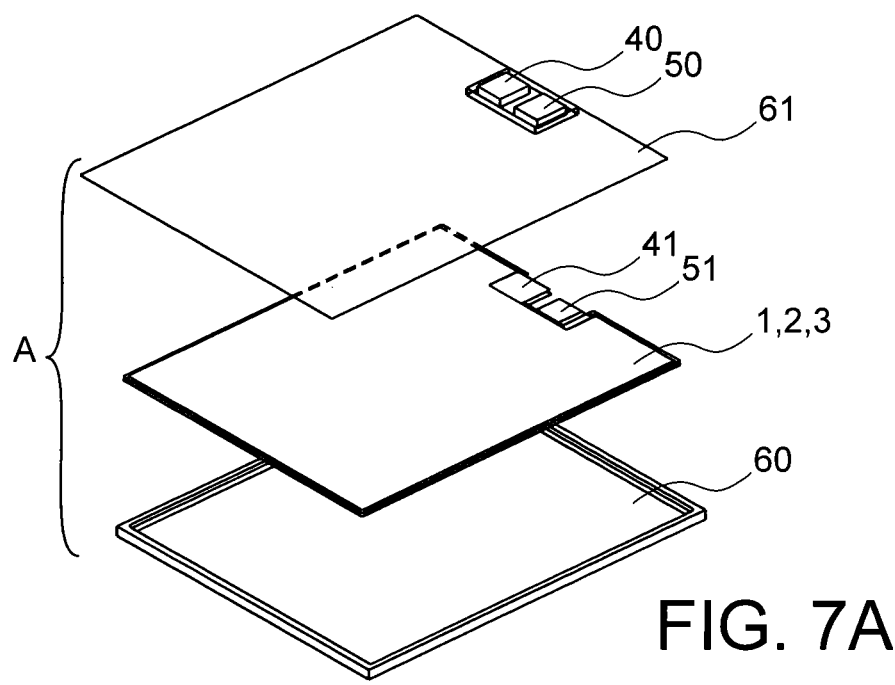
Figure 8:
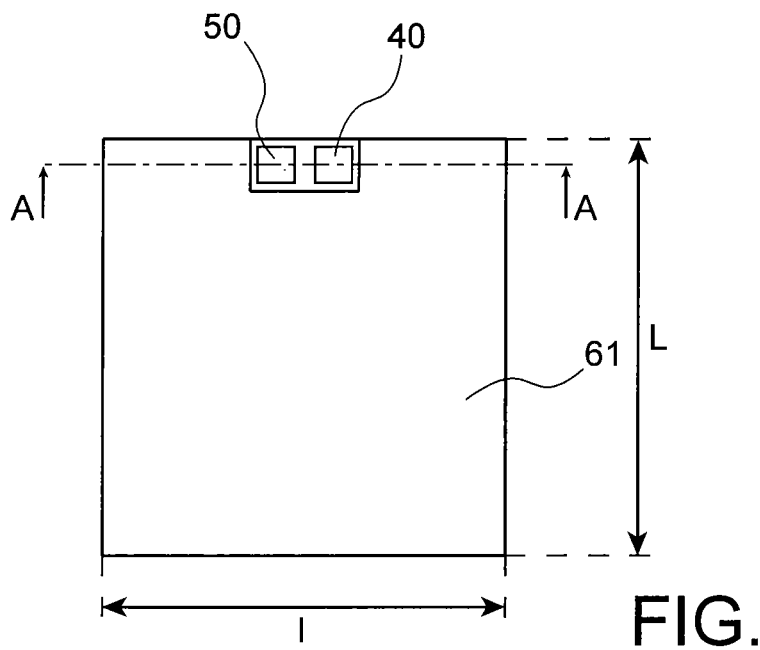
Figure 8A:
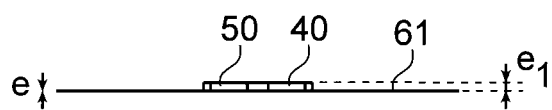
Figure 8B:
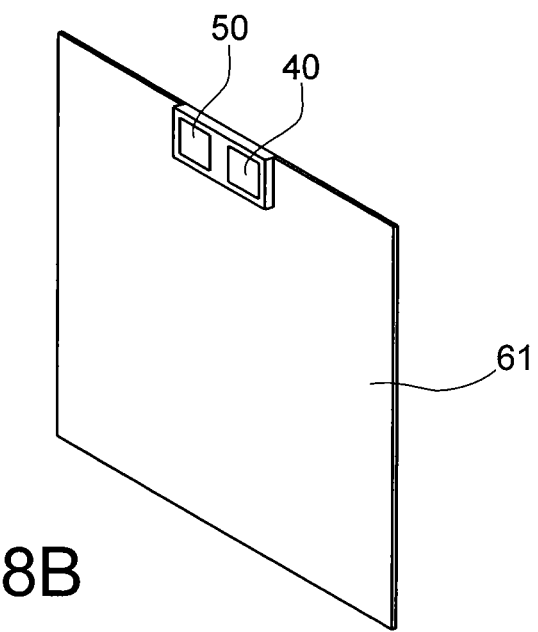
Figure 9:
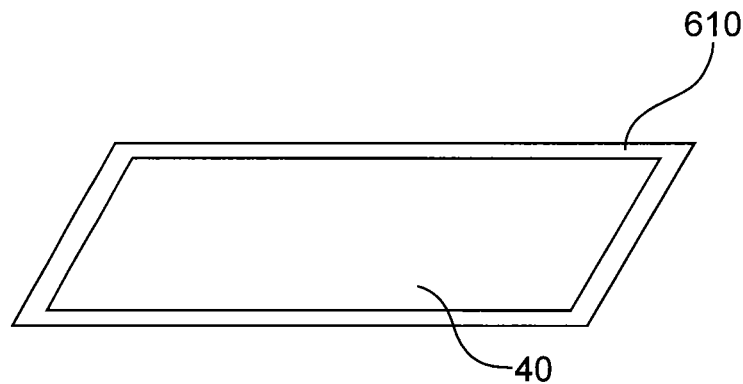
Figure 10:
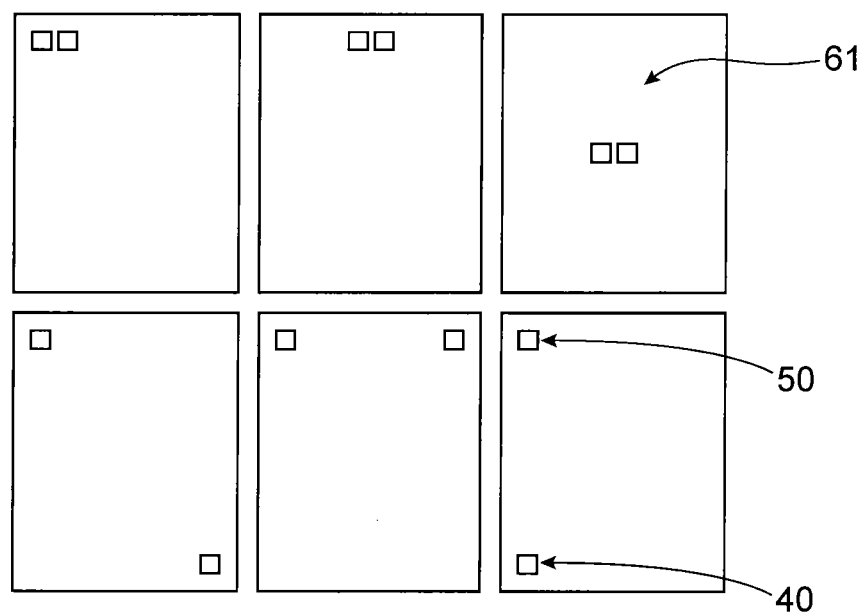

Other advantages and characteristics of the invention can be deduced on reading the detailed description given as an illustration, and not restrictively, with reference to the following figures which represent respectively:

FIG. 1 is a schematic perspective exploded view showing the different elements of a lithium-ion accumulator, FIG. 2 is a front view showing a lithium-ion accumulator with its flexible packaging according to the state of the art, FIG. 3 is a schematic perspective exploded view showing the different elements of a lithium-ion accumulator A with a first type of rigid packaging according to the state of the art, FIG. 3A is a detailed section view of a portion of accumulator A according to FIG. 3, FIG. 4 is a schematic perspective exploded view showing the different elements of a lithium-ion accumulator A with a second type of rigid packaging according to the state of the art, FIG. 4A is a detailed section view of a portion of the accumulator according to FIG. 4, FIG. 5 is a front view showing a lithium-ion accumulator with a flexible packaging according to the invention comprising self-bonded PEEK™ sheets, FIG. 6 is a schematic perspective exploded view showing a step of manufacture of flexible PEEK™ sheets incorporating a metal stud in accordance with the invention, FIG. 6A is a schematic perspective exploded view showing the different elements of a lithium-ion accumulator A with a flexible packaging according to the invention comprising a PEEK™ sheet manufactured in accordance with FIG. 6, FIG. 7 is a schematic perspective exploded view showing a step of manufacture of a rigid PEEK™ sheet incorporating a metal stud in accordance with the invention, FIG. 7A is a schematic perspective exploded view showing the different elements of a lithium-ion accumulator A with a rigid packaging according to the invention comprising a PEEK™ sheet manufactured in accordance with FIG. 7, FIG. 8 is a front view showing a rigid PEEK™ sheet manufactured in accordance with FIG. 7, FIG. 8A is a section view along axis AA of the rigid PEEK™ sheet according to FIG. 8, FIG. 8B is a perspective view of the rigid PEEK™ sheet according to FIG. 8, FIG. 9 shows a piece of PEEK™ sheet manufactured according to the invention:

FIG. 10 shows different possible ways of integrating metal studs in a PEEK™ sheet according to the invention.

DETAILED ACCOUNT OF PARTICULAR EMBODIMENTS

FIGS. 1 and 4 concern lithium-ion accumulators A with flexible and rigid packaging according to the state of the art: comments have been made concerning them in the preamble, and they will not therefore be described in greater detail below.

For the sake of clarity, the same elements of the state of the art and according to the invention are designated by the same references.

In the context of the invention, a PEEK™ sheet is considered to be flexible if it is less than approximately 200 µm thick, and rigid when it is more than 200 µm thick.

Indeed, the bending stiffness of a PEEK™ sheet depends on its Young's modulus, and also on the moment of inertia of its section, this moment being proportional to its thickness.

By characterising the PEEK polymer with the following characteristic magnitudes:

Density: 1320 kg/m$^3$,
Young's modulus: 3.7 Gpa,
Elastic limit (σt): 92 Mpa, it is thus possible to consider that, bearing in mind the application (packaging of an electrochemical accumulator), and therefore the other required dimensions (length of 20 to 200 mm and width of 10 to 200 mm), a PEEK sheet of unit thickness of less than approximately 200 µm constitutes a portion of flexible packaging, whereas a PEEK sheet of unit thickness greater than approximately 200 µm constitutes a portion of rigid packaging.

This being so, the skilled man in the art can choose the existing type of PEEK™ polymers in accordance with the Young's modulus sought for the rigidity.

It may therefore be considered that a sheet manufactured from a PEEK™ with a semi-crystalline structure is rigid when its Young's modulus is greater than or equal to 2.2±0.2 GPa. Similarly, it may be considered that a sheet of amorphous PEEK™ is rigid when its Young's modulus is greater than or equal to 1.7±0.2 GPa. Other existing PEEK™ varieties, the Young's modulus of which is between 3.5 GPa and 23 GPa, and the bending modulus of which is between 3.1 GPa and 20 GPa, and having an elastic limit of between 150 and 250 MPa, can be chosen without difficulty in connection with the invention.

FIG. 5 shows a lithium-ion accumulator with a flexible packaging A according to the invention comprising multiple PEEK™ sheets 6 which are self-bonded at their periphery 6'. In order to make these sheets 6 adhesive, PEEK™ sheets cut from an unworked or unrefined, 12 µm-thick PEEK™ film were subjected to a plasma treatment.

Not only did the adhesive character of the PEEK™ sheets treated in this manner by plasma prove satisfactory, but in addition this adhesion was not degraded when the sheets were placed in an electrolytic bath.

FIG. 6 represents a step of a method for manufacturing flexible PEEK™ sheets according to the invention. Each sheet 6.1, 6.2 is pierced with an opening. A rigid divider 10, also pierced with an opening, is inserted between these flexible sheets 6.1, 6.2, such that the openings match one another, in order to hold them mechanically when a copper or aluminium bar 9, having been subjected to freezing in liquid nitrogen, is introduced.

Frozen bar 10 is then held in the opening of sheets 6.1, 6.2 at ambient temperature until it is adjusted whilst tightening.

A cut is then made in each sheet in the straight section of the bar in order to constitute a metal stud 40 or 50 integrated within each sheet 6.1, 6.2.

In FIG. 6A a flexible packaging manufactured from a PEEK sheet incorporating both studs 40, 50 within it has been represented, bonded with another, unperforated PEEK sheet. The bonding is of the ultrasonic type to guarantee the continuity of the PEEK/PEEK material at the periphery, and therefore the sealing of the lithium-ion accumulator. The represented accumulator comprises two electrochemical cells with two cathodes 20, 21, two electrolyte separators 10, 11 and a common anode 3.

After this, in order to be sure of the connection between studs 40, 50 and portion 41, 51 of the current collectors internal to the packaging, electric or ultrasonic welding spots were made between them (copper/copper or aluminium/aluminium welding).

FIG. 7 illustrates the same step as the step according to FIG. 6, but in order to manufacture a rigid PEEK sheet 61. In this case, the thickness of the rigid sheet is at least equal to 200 µm, and there is therefore no requirement for a divider when frozen bar 9 is inserted.

As represented in FIG. 7A, rigid PEEK sheet 61 produced in this manner constitutes a case cover comprising a base 60 also made of machined PEEK, where base 60 and cover 61 are bonded to one another by ultrasonic bonding. Case 6 manufactured in this manner constitutes a rigid packaging of accumulator A, where studs 40, 50 incorporated within cover 61 are connected to the internal portions, respectively 41, 51, of the current collectors, which are themselves each connected to one of electrodes 2.3. The accumulator represented here comprises a single electrochemical cell 1, 2, 3.

As shown in FIGS. 8 and 8B, the standard dimensions of PEEK cover 61 according to the invention are:

e=200 µm,
$e_1$=700 µm,
l 20 mm to 200 mm,
L of 10 mm to 200 mm.

FIG. 9 illustrates a step of another method for manufacturing a PEEK sheet according to the invention: piece 610 of an adhesive PEEK sheet is bonded to a metal sheet 40 constituting a stud according to the invention. An ultrasonic bond of the PEEK/PEEK type is made on another piece of PEEK sheet in the area of an opening.

In the embodiments described above the metal studs can be of different shapes, either simple points (a very small diameter disk), or larger, depending on the capacity of the battery. They can also be parallelogram or square in shape.

In FIG. 10 various forms of integration of the two metal studs 40, 50 in the rigid PEEK™ cover 61 of the case have been represented.

The flexible or rigid packagings which have been described above can concern primary lithium batteries, i.e. those of which the negative electrode includes metal lithium. In this case corresponding metal stud 50 is preferably made of copper. The positive electrode can be made of manganese oxide, for example ($MnO_2$).

As described above, they can equally concern lithium-ion accumulators and secondary lithium batteries.

The different pairs of electrodes can thus be packaged in accordance with the invention:

1. Negative electrode: graphite carbon Positive electrode: $LiFePO_4$,
2. Negative electrode: graphite carbon Positive electrode: $LiNi_{0.33}Mn_{0.33}Co_{0.33}O_2$
3. Negative electrode: graphite carbon, Positive electrode: $LiNi_xCo_yAl_zO_2$ with x+y+z=1,
4. Negative electrode: graphite carbon, Positive electrode: $LiMnO_2$,
5. Negative electrode: graphite carbon, Positive electrode: $LiNiO_2$,
6. Negative electrode: titanate $Li_4Ti_5O_{12}$, Positive electrode: $LiFePO_4$.

Batteries known as "energy" or "power" batteries can be packaged without difficulty by flexible or rigid packagings according to the invention.

Batteries of the NiMH type can also be packaged by flexible or rigid packagings according to the invention.

Li-ion batteries comprising an electrode based on a material formed from a carbon-silicon composite can also be used in the context of the invention.

All electrolyte separators can be suitable for the flexible or rigid packaging according to the invention.

This may concern separators made of microporous polymers such as polyethylene (PE), polypropylene (PP), polytetrafluoroethylene (PTFE), polyvinyl chloride (PVC) or vinylidene polyfluoride (PvdF). The polypropylene and polyethylene used can be used in the form of films manufactured by extrusion followed by stretching or a step of laminating. This may also concern single-layer PE or PP separators in the form of several superimposed layers of polyolefin (for example, PE/PP/PE).

It may also concern separators known as "composite" separators manufactured in the form of a layer of polymers, such as polyethylene terephtalate (PET), of very low thickness, of the order of 15 µm, which is then covered with ceramic grains made of alumina ($Al_2O_3$) and silica ($SiO_2$).

It may also concern separators based on non-woven glass fibre immersed in a polymer to improve their very poor mechanical stability.

Finally it may concern ceramic separators, such as alumina.

Other embodiments may be devised without however going beyond the scope of the invention, namely proposing an electrochemical accumulator packaging comprising at least one made of a PAEK, such as PEEK™.

Thus, although in the embodiments illustrated in detail in FIGS. 5 to 10 the packaging solution with at least one metal stud incorporated within a PEEK™ sheet concerns the packagings which it is sought should be rigid, it can equally apply to packagings which it is sought should be flexible.

Similarly, whereas in FIGS. 6A, 7A, 8, 8A, 8B and 10 both metal studs 40, 50 are designed such that they are incorporated within a given PEEK™ sheet and both fitted on the same face of the accumulator, it is equally possible to fit one stud on one face of the accumulator, and the second stud on the other face of the accumulator.

As previously mentioned, only a single flexible PEEK™ sheet is required to manufacture the packaging of an electrochemical accumulator. PEEK™ sheets which are currently commercially available of unit thickness 12 µm, 30 µm, 70 µm are suitable in connection with the invention. Several sheets of these ranges of thickness may be attached together to improve the packaging's mechanical resistance.

The invention claimed is:

1. An electrochemical accumulator, comprising:
an electrochemical cell; and
a sealed package incorporating the electrochemical cell;
wherein
the electrochemical cell comprises:
an anode connected to a first current collector;
a metal stud welded to the first current collector traversing the sealed package;
a cathode connected to a second current collector;
a metal stud welded to the second current collector traversing the sealed package; and
an electrolyte,
wherein
the sealed package consists of a single polyaryletherketone (PAEK) sheet folded into two portions and directly attached to one another at their periphery, and each metal stud extends through the sealed package to the thickness of the PAEK sheet and does not protrude beyond a surface plane of the sealed package.

2. The electrochemical accumulator of claim 1, wherein both portions of the PAEK sheet folded into two are directly attached to one another by self-adhesion, bonding, ultrasound, laser, or by heat sealing.

3. The electrochemical accumulator of claim 1, which is a lithium-ion accumulator.

4. A method for manufacturing the electrochemical accumulator of claim 1, the method comprising:
A) forming an opening within a polyaryletherketone (PAEK) sheet;
B) freezing a metal bar to reduce a straight section of the metal bar to dimensions smaller than those of the opening in the sheet;
C) introducing the frozen bar into the opening of the sheet;
D) holding the frozen bar in the opening of the sheet at ambient temperature until the metal bar is adjusted whilst tightening; and then
E) cutting the metal bar along straight section in a plane of a surface of the PAEK sheet, once the metal bar has expanded and adjusted whilst tightening in the opening of the sheet, to obtain the metal stud.

5. The method of claim 4, wherein the hole in A) is formed in a single sheet having a thickness such that it is rigid.

6. The method of claim 5, comprising:
C') during C), introducing the frozen bar into the opening of the rigid sheet until a connection is made with a portion of a current collector positioned on a side of the rigid sheet opposite the side that the bar was introduced;
D') during D), holding the connection of the metal bar with the current collector;
E') during E), cutting the metal bar only on the side of the rigid sheet through which the bar was introduced, wherein the stud incorporated in the rigid sheet is also permanently connected with the portion of the current collector.

* * * * *